United States Patent
Daloukas et al.

(10) Patent No.: US 11,455,442 B1
(45) Date of Patent: Sep. 27, 2022

(54) ELECTROMAGNETIC CHARACTERISTIC EXTRACTION OF LARGE-SCALE INTEGRATED CIRCUITS

(71) Applicant: Ansys, Inc., Canonsburg, PA (US)

(72) Inventors: Konstantis Daloukas, Kalogreza (GR); Kostas Karouzakis, Athens (GR); Yiannis Moisiadis, Athens (GR); Dimitris Dakopoulos, Dublin (IE)

(73) Assignee: Ansys, Inc., Canonsburg, PA (US)

( * ) Notice: Subject to any disclaimer, the term of this patent is extended or adjusted under 35 U.S.C. 154(b) by 212 days.

(21) Appl. No.: 16/731,296

(22) Filed: Dec. 31, 2019

(51) Int. Cl.
G06F 30/20 (2020.01)
G06F 17/11 (2006.01)
G06F 17/16 (2006.01)
G06F 111/10 (2020.01)

(52) U.S. Cl.
CPC .............. *G06F 30/20* (2020.01); *G06F 17/11* (2013.01); *G06F 17/16* (2013.01); *G06F 2111/10* (2020.01)

(58) Field of Classification Search
CPC .......... G06F 30/20; G06F 17/11; G06F 17/16; G06F 2111/10
See application file for complete search history.

(56) References Cited

U.S. PATENT DOCUMENTS

| | | | | |
|---|---|---|---|---|
| 7,908,131 B1* | 3/2011 | Li | ................. | G06F 30/367 703/13 |
| 11,079,294 B2* | 8/2021 | Kageyama | ............. | G05G 9/047 |
| 2016/0328508 A1* | 11/2016 | Daloukas | ................. | G06F 30/30 |
| 2016/0378889 A1* | 12/2016 | Moisiadis | ............. | G06F 30/327 716/104 |
| 2016/0378905 A1* | 12/2016 | Moisiadis | ............. | G06F 30/327 716/104 |
| 2018/0307785 A1* | 10/2018 | Ataka | ..................... | G06F 30/23 |

OTHER PUBLICATIONS

Hong, Z., Fang, W., En, Y., Luo, C., Shao, W., Wang, L., He, Z. and Shao, E., 2019. Electromagnetic Pattern Extraction and Grouping for Near-Field Scanning of Integrated Circuits by PCA and K-Means Approaches. IEEE Transactions on Electromagnetic Compatibility, 61(6), pp. 1811-1822. (Year: 2019).*

* cited by examiner

*Primary Examiner* — Chuen-Meei Gan
(74) *Attorney, Agent, or Firm* — Jones Day (57) ABSTRACT

Methods, systems, and computer program products are described for extracting electromagnetic characteristics from a large-scale integrated circuit. An input layout of the large-scale integrated circuit is received. The input layout includes a netlist having a plurality of segments. Groups of segments from the plurality of segments are identified based on magnetic coupling. A plurality of matrices are generated including a conductance matrix, a capacitance matrix, and an inductance matrix. Submatrices of the inductance matrix are based on the groups of segments. Each submatrix represents inductances among segments within one of the groups or representing inductances between a pair of the groups of segments. A simulation model is output based on the plurality of matrices for simulation of the large-scale integrated circuit.

20 Claims, 8 Drawing Sheets

ELECTROMAGNETIC CHARACTERISTIC EXTRACTION OF LARGE-SCALE INTEGRATED CIRCUITS

TECHNICAL FIELD

The present disclosure relates generally to the field of electromagnetic modeling and extraction, and, more specifically, to modeling and extraction of large-scale integrated circuits.

BACKGROUND

Computer modeling provides a number of benefits to product development. With computer modeling, computer software can extract a mathematical representation of a physical world object. Users can interface with the computer software and manipulate various features of the physical world object and/or simulate responses of the physical world object to various environmental conditions. Electromagnetic modeling is a type of computer modeling that models electromagnetic characteristics of physical world objects. Electromagnetic modeling of contemporary integrated circuits (ICs) can be an extremely computational and memory demanding process. Mathematical representations in electromagnetic modeling can include inductance matrices that capture the magnetic properties of the physical world object. Inductance matrices for large-scale ICs can be very dense and can contain trillions of elements, mainly due to the fact that mutual inductance interactions between segments cannot be ignored without loss of accuracy or passivity, regardless of their distance. The larger the mathematical representations, the more demand there is on the computer(s) operating the modeling.

SUMMARY

In one aspect, a method for extracting electromagnetic characteristics from a large-scale integrated circuit includes receiving an input layout of the large-scale integrated circuit. The input layout includes a netlist having a plurality of segments. Groups of segments from the plurality of segments are identified based on magnetic coupling. A plurality of matrices are generated including a conductance matrix, a capacitance matrix, and an inductance matrix. Submatrices of the inductance matrix are based on the groups of segments. Each submatrix represents inductances among segments within one of the groups or representing inductances between a pair of the groups of segments. A model-order reduction methodology is applied to generate the set of reduced order matrices and a simulation model is output based on the plurality of reduced matrices for simulation of the large-scale integrated circuit.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides an efficient methodology for storage and manipulation of mathematical representations of a large-scale IC, such as the inductance matrix. With the use of a hierarchical matrix coupled with an appropriate model-order reduction, a scalable model can be extracted from a large-scale IC layout. The scalable model can be used for simulation purposes having low computational and/or memory requirements.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

Like reference symbols in the various drawings indicate like elements.

DETAILED DESCRIPTION

The framework described herein relates to electromagnetic modeling of large-scale ICs. A user may want to obtain a simulatable model from a very complex IC in order to perform circuit simulations and/or determine behaviors of the circuit under various operating conditions before chip manufacturing. An inductance matrix formatted as a hierarchical matrix (H-Matrix) along with resistance and capacitance matrices are extracted from a layout of a large-scale IC. The set of matrices is then reduced in order using a suitable model-order reduction methodology that employs sparsification of the inverted inductance matrix and takes full advantage of the properties of the H-Matrix, thus greatly reducing computational and memory requirements. The output of the framework is a set of reduced models that can be simulated by any circuit simulator for efficient analysis of the underlying large-scale IC.

Figure 1:
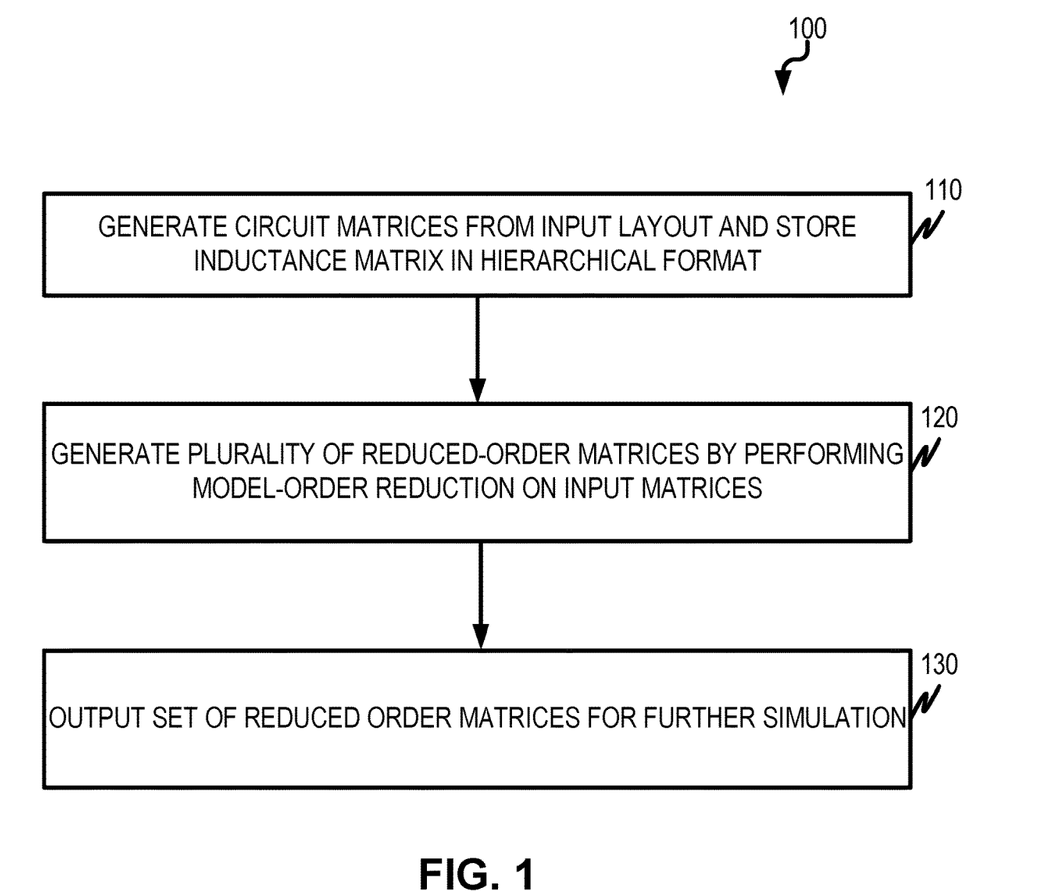
FIG. 1 illustrates an exemplary process flow diagram for generating a set of reduced-order models that can be simulated for circuit analysis of a large-scale IC layout.

FIG. 1 illustrates an exemplary process flow diagram 100 for generating a set of reduced-order models that can be simulated for circuit analysis of a large-scale IC layout. In step 110, the resistance, capacitance, and inductance matrices are extracted from an input circuit layout, such as a large-scale IC layout, and the inductance matrix is stored as an H-Matrix. A plurality of reduced-order matrices are generated by performing model-order reduction on the extracted matrices at step 120. These reduced-order matrices representing the large-scale IC layout are output at step 130. These reduced-order matrices can be used for further simulation by any circuit simulator. Because the matrices are formatted in a reduced order, minimal computation resources and/or memory is required for simulation.

Figure 2:
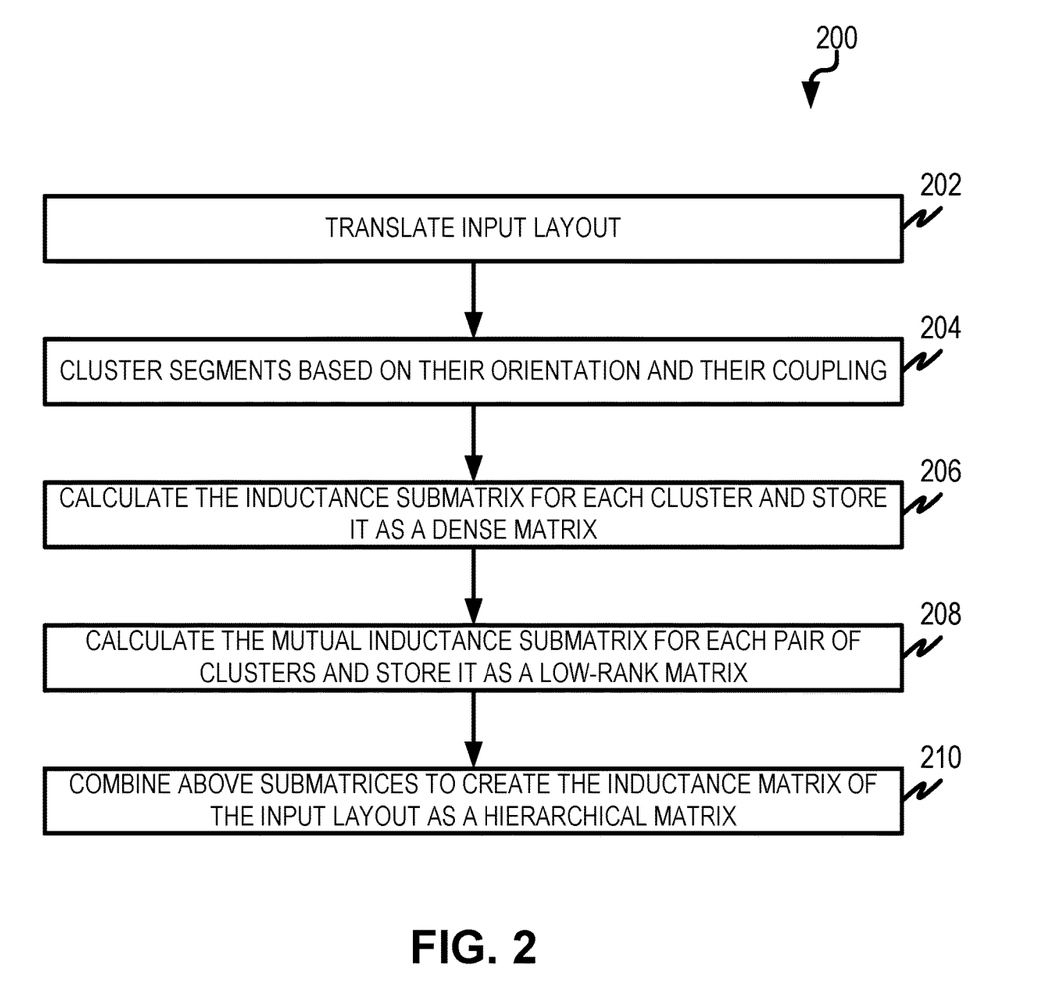
FIG. 2 illustrates an exemplary process flow diagram for extracting an inductance matrix from an input layout and saving it as an H-Matrix.

FIG. 2 illustrates an exemplary process flow diagram 200 for extracting an inductance matrix from an input layout and saving it as an H-Matrix (e.g., step 110 of FIG. 1). An IC layout is an overlay of planar geometric shapes, which represent the various layers used for the fabrication of the IC. The purpose of the segmentation methodology is to process custom polygons and/or shapes in the IC layout, by taking into account both geometry and connectivity information. This information is used to generate an equivalent segment-based description and corresponding connectivity information for back-annotation purposes. The description of the layout in a segment-based format can be used by any segment-based modeling methodology, to extract a netlist. A netlist is an electronic file that defines a various electrical components and their interconnections within an IC. The more components and connections within an IC, the larger the netlist. At step 202, an input layout, such as a large-scale IC layout, is translated into a number of segments. The segments are used to model the electrical characteristics of the layout (e.g., resistance, capacitance, and/or self and mutual inductance). Using a segment-based clustering method, the segments are clustered together at step 204 based on their magnetic coupling. For example, a segment-based clustering method such as a k-means clustering or a k-medoid clustering algorithm can be used. The k-means algorithm partitions n observations into k clusters. Each of the n observations is placed into a cluster with the nearest mean to that observation. The k-medoid clustering algorithm is a variant of the k-means algorithm. The k-medoid clustering algorithm clusters together segments based on the interaction of the segments using a magnetic coupling factor. The magnetic coupling factor takes into account both the distance between segments as well as their geometric characteristics and relative orientation, is evaluated based on a "strong" or "weak" interaction. Larger segments that are far apart may interact more strongly than smaller segments that are in close proximity. Segments that are perpendicular to each other have a zero coupling factor and do not couple together. In other words, these segments belong to different clusters. An example clustering scenario is described in more detail in FIG. 3.

An inductance submatrix is calculated at step 206 for each cluster utilizing Maxwell's equations, where self-inductance and mutual-inductance is calculated for the segments. The inductance submatrix is stored in a full rank (e.g., dense) representation. A mutual inductance submatrix is calculated for each pair of clusters at step 208. Pairs of clusters are calculated during the clustering step (e.g., step 204) and mutual inductance is calculated for each pair of segments belonging to different clusters using Maxwell's equations. Mutual inductance submatrices are stored using low-rank approximation. The inductance and mutual inductance submatrices are then combined at step 210 in order to formulate the full inductance matrix as an H-Matrix. The details of this combination are described in more detail in FIG. 4. The H-Matrix results in significant memory savings in the case of weak coupling between clusters as the off-diagonal blocks. The H-Matrix is saved using a low-rank representation.

Figure 3:
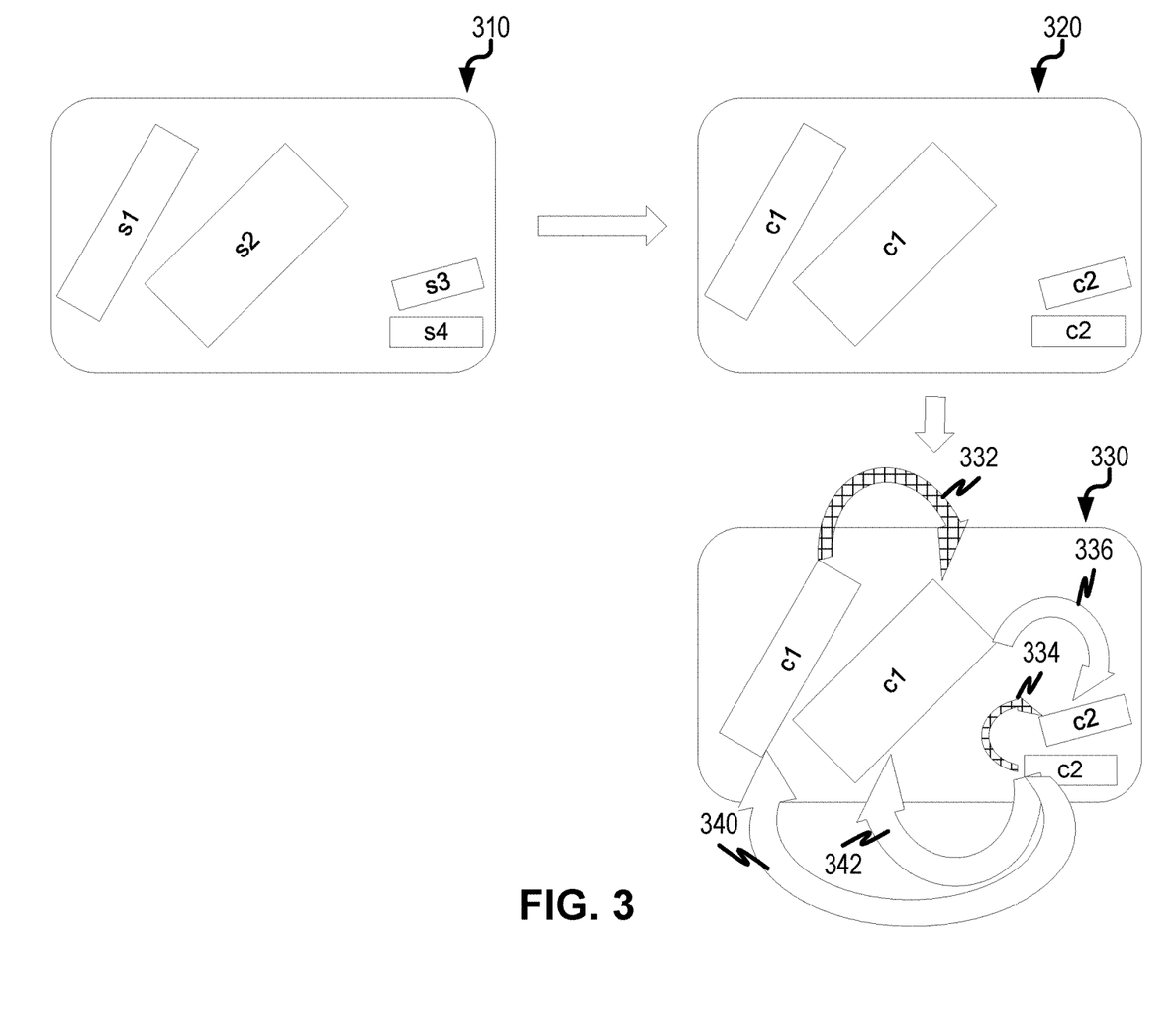
FIG. 3 is an exemplary flow diagram illustrating clustering in stages using k-medoid clustering.

FIG. 3 is an exemplary flow diagram illustrating clustering in stages using k-medoid clustering. In this example, an input layout was parsed into four segments: s1, s2, s3, and s4. During a first stage 310 of clustering, magnetic coupling interactions between the four segments s1, s2, s3, and s4 are analyzed. Segments s1 and s2 interact more strongly with each other than with s3 and s4. This stronger interaction is due, in part, to the geometric characteristics (e.g., s1 and s2 contain similar side lengths). Similarly, segments s3 and s4 interact more strongly with each other than with s1 or s2. Such an interaction is again due to geometric characteristics (e.g., s3 and s4 contain similar side lengths). During a second stage 320, clusters are generated with the segments that interact strongly together. For example, a first cluster c1 is generated with segments s1 and s2 because of their strong interaction. Similarly, a second cluster c2 is generated using segments s3 and s4. During a third stage 330, a plurality of submatrices are formed from the clusters. The plurality of submatrices include, for example, an inductance submatrix and a mutual inductance submatrix. An inductance submatrix can be formed for each cluster, which are determined from the clustering algorithm (e.g., relationships 332, 334). The inductance submatrix is a full-rank representation of each cluster. A mutual inductance submatrix is generated for each pair of clusters (e.g., relationships 336, 340, 342). The mutual inductance submatrix for each pair of clusters is stored as a low-rank approximation.

Figure 4:
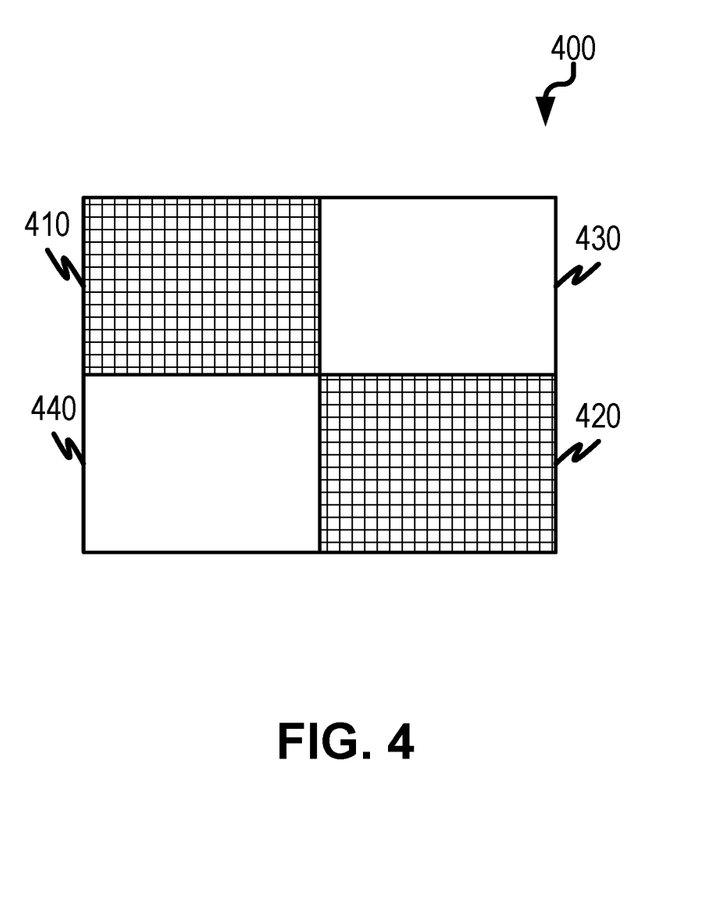
FIG. 4 is an exemplary H-Matrix generated based on the clusters of segments.

FIG. 4 is an exemplary H-Matrix 400 generated based on the clusters of segments. H-Matrix 400 includes a hierarchy of 2×2 blocks. Continuing with the example illustrated in FIG. 3, blocks 410, 420 in the main diagonal are stored as full matrices (e.g., inductance submatrices that are full rank representations of relationships 332, 334). Off-diagonal blocks 430, 440 of H-Matrix 400 are represented as low-rank matrices (e.g., mutual inductance submatrices that are low-rank approximations of each pair of clusters depicted by relationships 336, 338, 340, 342). In some embodiments, the low-rank approximation can be calculated by utilizing a Singular Value Decomposition (SVD) algorithm. For example, if $A \in \mathbb{R}^{n1 \times n2}$ is an off-diagonal block, then by applying the SVD, the off-diagonal block is stored as a product of two other matrices $B \in \mathbb{R}^{n1 \times k}$, and $C \in \mathbb{R}^{k \times n2}$, where k is a rank of the matrices. After applying SVD, the memory complexity for storing A drops from approximately O(n1×n2) to approximately O(k(n1+n2)), resulting in significant memory savings. In other embodiments, the low-rank approximation can be calculated using any rank-revealing algorithm.

Figure 5:
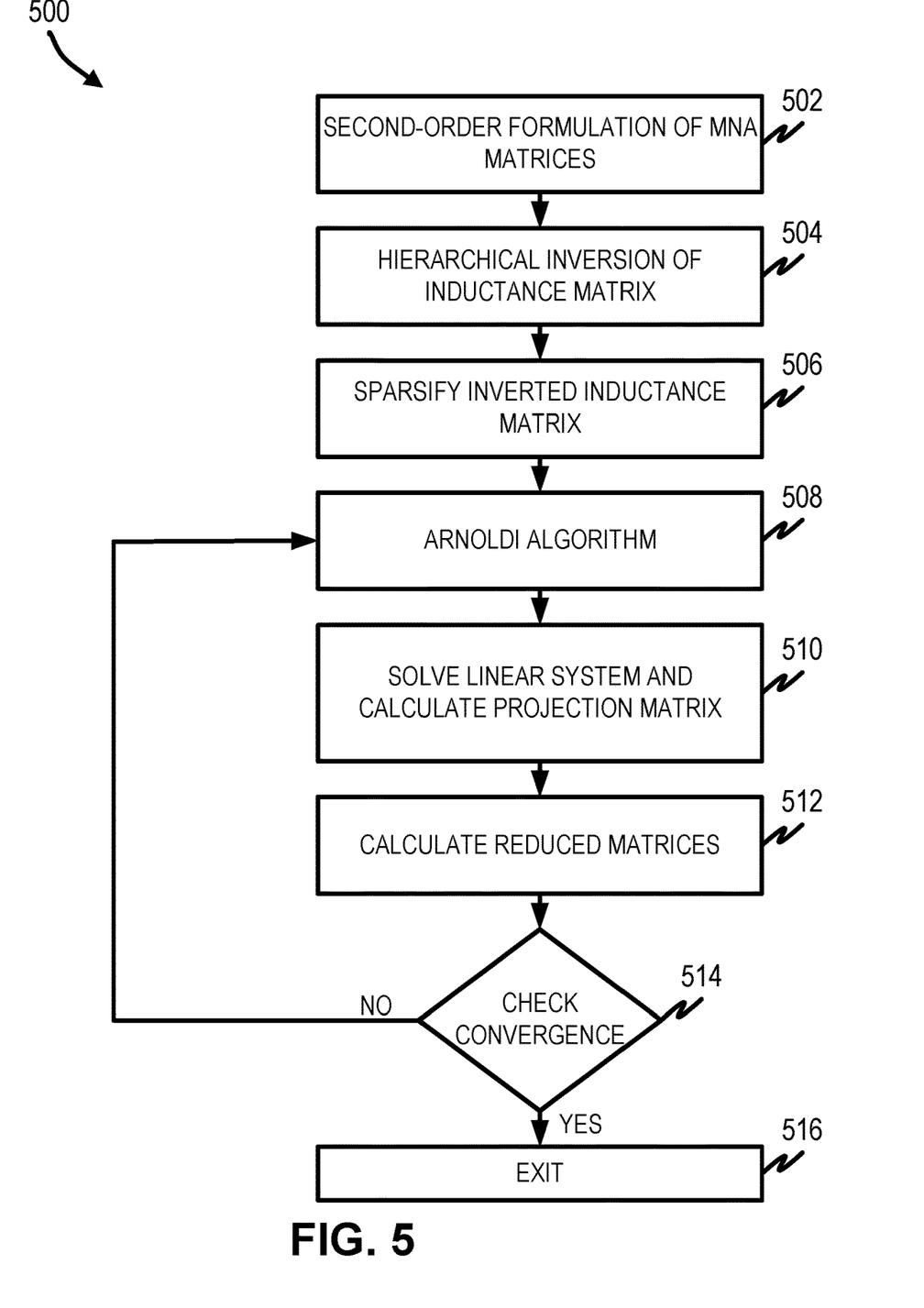
FIG. 5 is an exemplary process flow diagram for performing model-order reduction of a system where the inductance matrix is stored as an H-Matrix.

FIG. 5 is an exemplary process flow diagram 500 for performing model-order reduction of a system where the inductance matrix is stored as an H-Matrix (e.g., step 120 of FIG. 1). Once the set of matrices are generated after extraction (e.g., step 214 of FIG. 2), Maxwell's equations a model-order reduction are applied to the set of matrices as illustrated in FIG. 5. In some embodiments, a structure-preserving reduced-order interconnect macromodeling (SPRIM) is applied. In other embodiments, a Krylov-subspace method is applied as described in "Krylov-subspace methods for reduced-order modeling in circuit simulation," by Roland W. Freund, the contents of which is incorporated herein by reference in its entirety. The first step in the model-order reduction algorithm is to employ the modified nodal analysis (MNA) in order to formulate equations describing circuit operation.

An efficient methodology to formulate Kirchhoff's current and voltage laws is using a directional graph. The edges of the graph correspond to the circuit elements, while the nodes of the graph correspond to the nodes of the circuit, denoting the interconnections of the circuit elements. An arbitrary direction is assigned to graph edges, so that one can distinguish between the source and destination nodes. The directional graph can be described by its incidence matrix, A. Each row of the incidence matrix, A, corresponds to a graph edge and, therefore, to a circuit element. Each column of the incidence matrix, A, corresponds to a graph or circuit node. Each edge, e, is formed from an ordered pair of nodes, $n_1$ and $n_2$, where the direction of the edge, e, is from the ordered pair of nodes, $n_1$ to $n_2$. The column corresponding to the ground node of the circuit is deleted in order to remove redundancy. For a row which is associated with the edge, e, the column position which corresponds to the source node, $n_1$, contains the entry "1", while the column position which corresponds to the destination, $n_2$, contains the entry "−1". For all the other cases the entries are "0".

The Kirchhoff's current and voltage laws can be expressed using incidence matrix, A, can be expressed as follows:

$$A^T i_b = 0, \text{ and} \quad (1)$$

$$A v_n = v_b, \quad (2)$$

where $i_b$ is the vector of the currents through the circuit elements, $v_b$ is the vector of the voltages across the circuit elements, and $v_n$ is the vector of the voltages at the nodes of the circuit (e.g., the non-datum voltages). For the ground node, the voltage is assumed to be zero. In the most general case of analyzing circuits containing resistive, capacitive, inductive, and mutual inductive elements (e.g., RLCk), the circuit is excited by voltage and current sources. In this case the incidence matrix, A, and the vector of the currents, $i_b$, and the vector of voltages, $v_b$, can be portioned according circuit-element types expressed as follows:

$$A = \begin{pmatrix} A_v \\ A_i \\ A_g \\ A_c \\ A_l \end{pmatrix}, \quad (3)$$

$$i_b = \begin{pmatrix} i_v \\ i_i \\ i_g \\ i_c \\ i_l \end{pmatrix}, \text{ and} \quad (4)$$

$$v_b = \begin{pmatrix} v_v \\ v_i \\ v_g \\ v_c \\ v_l \end{pmatrix}, \quad (5)$$

where the subscripts g, c, and l refer to branches with resistors, capacitors, and inductors, respectively, and $v_b$ and $i_b$ denote the voltage and current sources of the network, respectively. The physical behavior of the circuit elements is expressed by the following branch constitutive (BCR) relations:

$$i_g = g v_g, \quad (6)$$

$$i_c = c \frac{\partial}{\partial t} v_c, \text{ and} \quad (7)$$

$$v_l = l \frac{\partial}{\partial t} i_l, \quad (8)$$

where g is a conductive diagonal matrix having conductance values along the diagonal, c is a capacitive diagonal matrix having capacitance values along the diagonal. These values are positive for any physical circuit, and are symmetric positive definite. In Eq. (8), l is an inductance matrix, which is also positive definite. If mutual inductances are includes, then l is a full matrix, otherwise it is a diagonal matrix.

The BCRs for the independent voltage and current sources of the network simply state that voltage source, $v_v$, and current source, $i_i$, are given functions that can be chosen as inputs to the network, whereas voltage source, $v_i$, and current source, $i_v$, are unknown output functions that need to be determined as part of the problem of solving the system of equations describing the given RLC network.

The MNA can be extracted by combining equations Eqs. (1)-(5), eliminating the current unknowns. MNA equations (e.g., Eqs. (1)-(5)) provide a system representation of an RLCk netlist, as a set of equations that form the time-domain state space representation. For an N-port network, this state space relates the port voltages and currents (e.g., $v_v$ and $i_i$) via the state-space vector, x, e.g., the node voltages, $v_n$, and the branch currents for voltage sources, $i_v$, and inductors, $i_l$, which can be represented by the following expressions:

$$C\dot{x} + Gx = Bu, \text{ and} \quad (9)$$

$$y = B^T x, \quad (10)$$

where C is a capacitance matrix, G is a conductance matrix, B is a nodes-to-input-port adjacency matrix, and $$x = \begin{bmatrix} v_n \\ i_l \\ i_v \end{bmatrix}, \quad (11)$$

$$u = \begin{bmatrix} -i_i \\ v_v \end{bmatrix}, \text{ and} \quad (12)$$

$$y = \begin{bmatrix} v_i \\ -i_v \end{bmatrix}. \quad (13)$$

The vectors u and y are the input vector and the output vector, respectively. The capacitance matrix, C, conductance matrix, G, and nodes-to-input-port adjacency matrix, B, can be represented by the following expressions:

$$C = \begin{bmatrix} Q & 0 \\ 0 & l \end{bmatrix}, \quad (14)$$

$$G = \begin{bmatrix} N & A_l^T \\ -A_l & 0 \end{bmatrix}, \text{ and} \quad (15)$$

$$B = \begin{bmatrix} A_i \\ 0 \end{bmatrix}. \quad (16)$$

where N is the matrix with the stamps of conductances (e.g., inverse of resistance) and Q is the matrix with the capacitor stamps, and can be represented by the following expressions:

$$Q = A_c^T c A_c \text{ and} \tag{17}$$

$$N = A_g^T g A_g. \tag{18}$$

Using Eqs. (14)-(16), the MNA matrices are formed at step 502 in a second-order form using the following expressions:

$$(N + sQ + (A_l^T * S * A_l)/s)v_1 = B, \tag{19}$$

$$v_2 = S*(A_l*v_1)/s, \text{ and} \tag{20}$$

$$S = l^{-1}, \tag{21}$$

where N is a conductance matrix, Q is the capacitance matrix, as extracted in step 212 of FIG. 2, l is the inductance matrix stored in the H-Matrix format and generated in step 210 of FIG. 2, and $A_l$ is a nodes-to-inductors incidence matrix as described in Eqs. (3)-(5), $A_l^T$ is a transpose of the nodes-to-inductors matrix, S is a susceptance matrix (e.g., inverse of the inductance matrix), s is a real value denoting a frequency, B is a nodes-to-input-ports adjacency matrix as described in Eqs. (14)-(16), $v_1$, $v_2$ are the solutions to the linear system. The advantage of the second-order form is that it can reduce the computational and memory requirements for solutions of the linear system described in Eqs. (19)-(20) as smaller systems need to be solved than the one described in Eqs. (9)-(10).

At step 504, the inductance matrix is inverted to generate the susceptance matrix, S, defined in Equation 3. In other words, the susceptance matrix, S, is the inverse of the inductance matrix. The inverse of the inductance matrix is also an H-Matrix and can be calculated recursively by applying the LU decomposition. As a result, the susceptance matrix, $l^{-1}$, can be calculated with low complexity by solving the following equation for each unit vector:

$$LU_{x_i} = y_i, \tag{22}$$

where $x_i$ and $y_i$ are unit vectors. A sparisification operation is applied to the susceptance matrix, S, at step 506, in order to convert it to a sparse matrix. A sparsification operations is a numerical technique where elements of a dense matrix are dropped based on a given threshold. The susceptance matrix, S, exhibits a locality property (e.g., element values decrease rapidly moving away from the diagonal of the matrix), thus can be sparsified without minimal to no accuracy or passivity loss.

After sparsification, solution of subsequent linear systems described in Eq. (19) can employ a sparse linear solver instead of the dense one and decrease computational and memory requirements. At step 510, the solution, $v_1$ and $v_2$, of the linear systems described in Eqs. (19)-(20) are used to calculate the projection matrices, V1 and V2. The model-order reduction (MOR) algorithm is based on a Krylov subspace projection that produces passive macromodels RCLk networks. Reduction is ensured using explicit projection of the data matrices describing the RCLk network into Krylov subspaces. The projection matrices are generated to match a certain number of moments of the initial N-port network, according to a given level of accuracy. Therefore, the reduction efficiency of speed are strongly dependent upon the required accuracy, the number of ports, and the size of the original netlist. For generating the projection matrices, the Arnoldi algorithm is utilized, at step 508. Arnoldi is a numerically stable method of generating the Krylov subspace to match q/N block moments of the N-port, where q is the order of reduction. Since the reduced order models are generated via projection onto Krylov subspaces, they satisfy the moment-matching property and are passive. The projection matrices, V1 and V2, are applied through a passivity-preserving congruence transformation to calculate the reduced matrices at step 512. The reduced matrices can be calculated using the following expressions:

$$\tilde{N} = V_1^T * N * V_1, \tag{23}$$

$$\tilde{Q} = V_1^T * Q * V_1, \tag{24}$$

$$\tilde{l} = V_2^T * l * V_2, \text{ and} \tag{25}$$

$$\tilde{B} = V_1^T * B, \tag{26}$$

where $\tilde{N}$ is a reduced-order conductance matrix, $\tilde{Q}$ is a reduced-order capacitance matrix, $\tilde{l}$ is a reduced-order inductance matrix, and $\tilde{B}$ is a reduced-order nodes-to-input-ports adjacency matrix. The main projection operation described in Eq. (25) is also accelerated by the properties of the H-Matrix format as the independent blocks (e.g., submatrices 410, 420, 430, 440) in the H-Matrix 400 offer ample parallelism for matrix-matrix multiplication. At step 514, a check is performed to determine whether the reduced-order matrices converge. Convergence is achieved between two consecutive iterations based on the difference in the reduced-order matrices are within a user-defined threshold. If the reduced-order matrices converge, then the software algorithm terminates and exits at step 516, and those matrices are output for further simulation (e.g., step 130 of FIG. 1). If, however, there is no convergence (e.g., the reduced-order matrices are outside of the user-defined threshold), the projection matrices, $V_1$ and $V_2$, are re-calculated at step 510 by generating an additional set of solutions (e.g., $v_1$ and $v_2$) using Eqs. (19)-(20) by increasing the number of moments and expansion points. The newly calculated solutions are then appended to the projection matrices, V1 and V2.

The output of the model-order reduction algorithm is a set of reduce-order model with a small sized compared to the original model. Owing to this, the models can be efficiently used in any simulator and any type of analysis.

Figure 6:
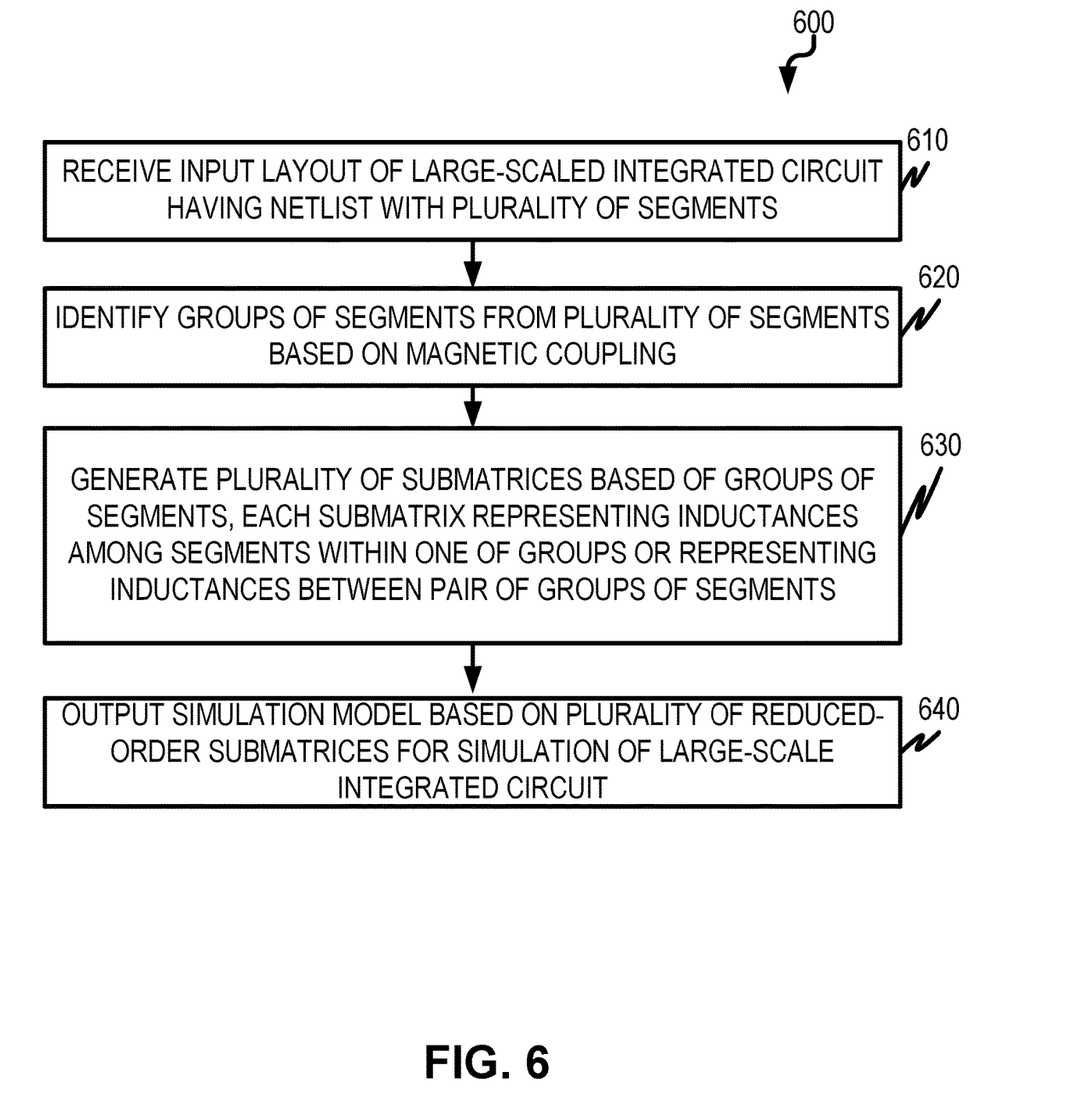
FIG. 6 is another exemplary process flow diagram for extracting electromagnetic characteristics from a large-scale integrated circuit.

FIG. 6 is another exemplary process flow diagram 600 for extracting electromagnetic characteristics from a large-scale integrated circuit. An input layout of the large-scale integrated circuit is received (e.g., step 610). The input layout includes a netlist having a plurality of segments. Groups of segments are identified from the plurality of segments based on magnetic coupling (e.g., step 620). A plurality of submatrices are generated based on the groups of segments (e.g., step 630). Each submatrix represents inductances among segments within one of the groups or representing inductances between a pair of the groups of segments. A simulation model based on the plurality of reduced-order submatrices is output for simulation of the large-scale integrated circuit (e.g., step 640).

Figure 7:
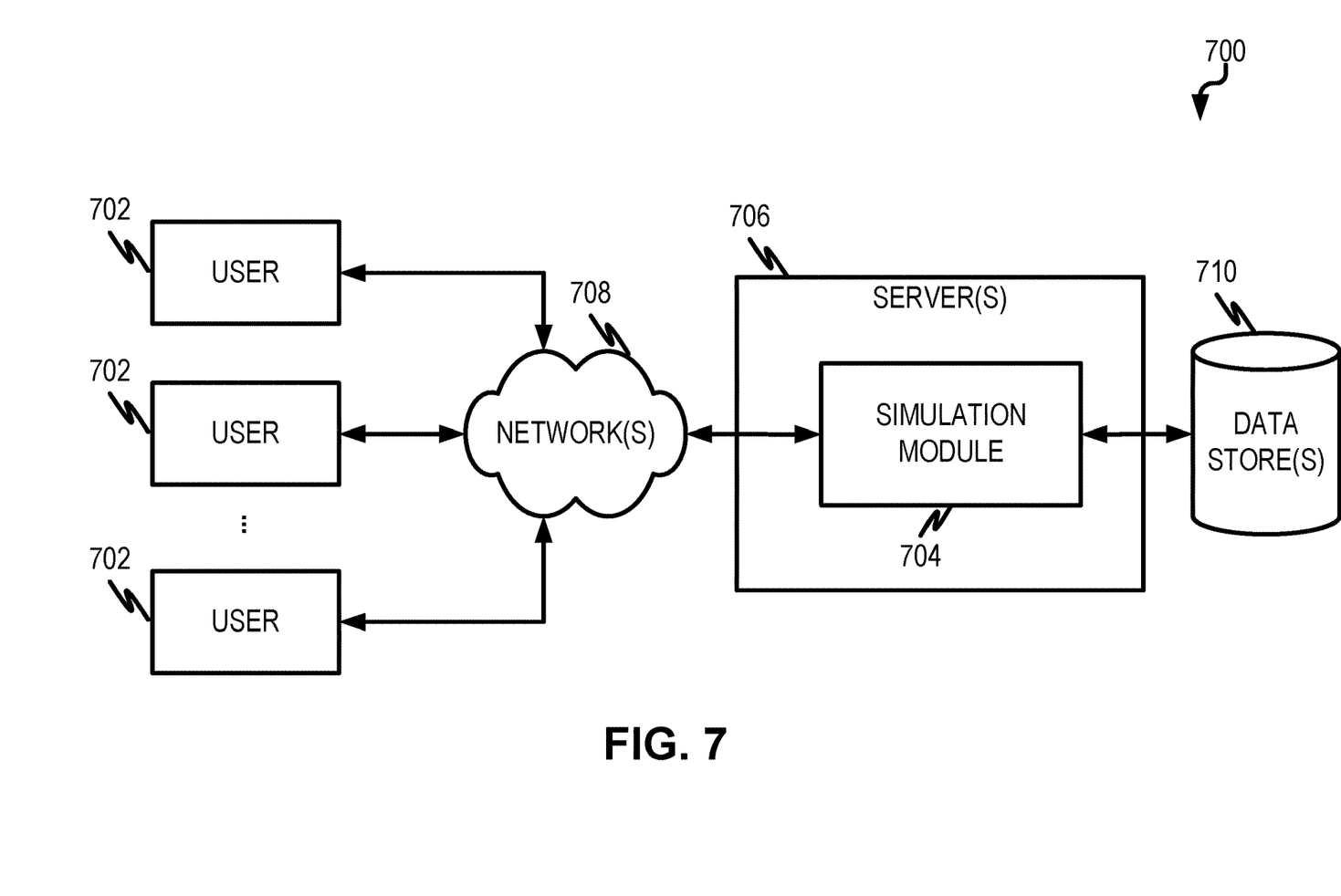
FIG. 7 illustrates an example computer-implemented environment for implementing various aspects described herein.

FIG. 7 illustrates an example computer-implemented environment 700 wherein users 702 can interact with a simulation module 704 having the various electromagnetic extraction capabilities as described herein hosted on one or more servers 706 through a network 708. The simulation module 704 can assist the users 702 with interfacing between an object-oriented modeling language based interface and a hardware description language based interface.

As shown in FIG. 7, the users 702 can interact with the simulation module 704 through a number of ways, such as over one or more networks 708. One or more servers 706 accessible through the network(s) 708 can host the simulation module 704. The one or more servers 706 can also contain or have access to one or more data stores 710 for storing data for the simulation module 704.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 8:
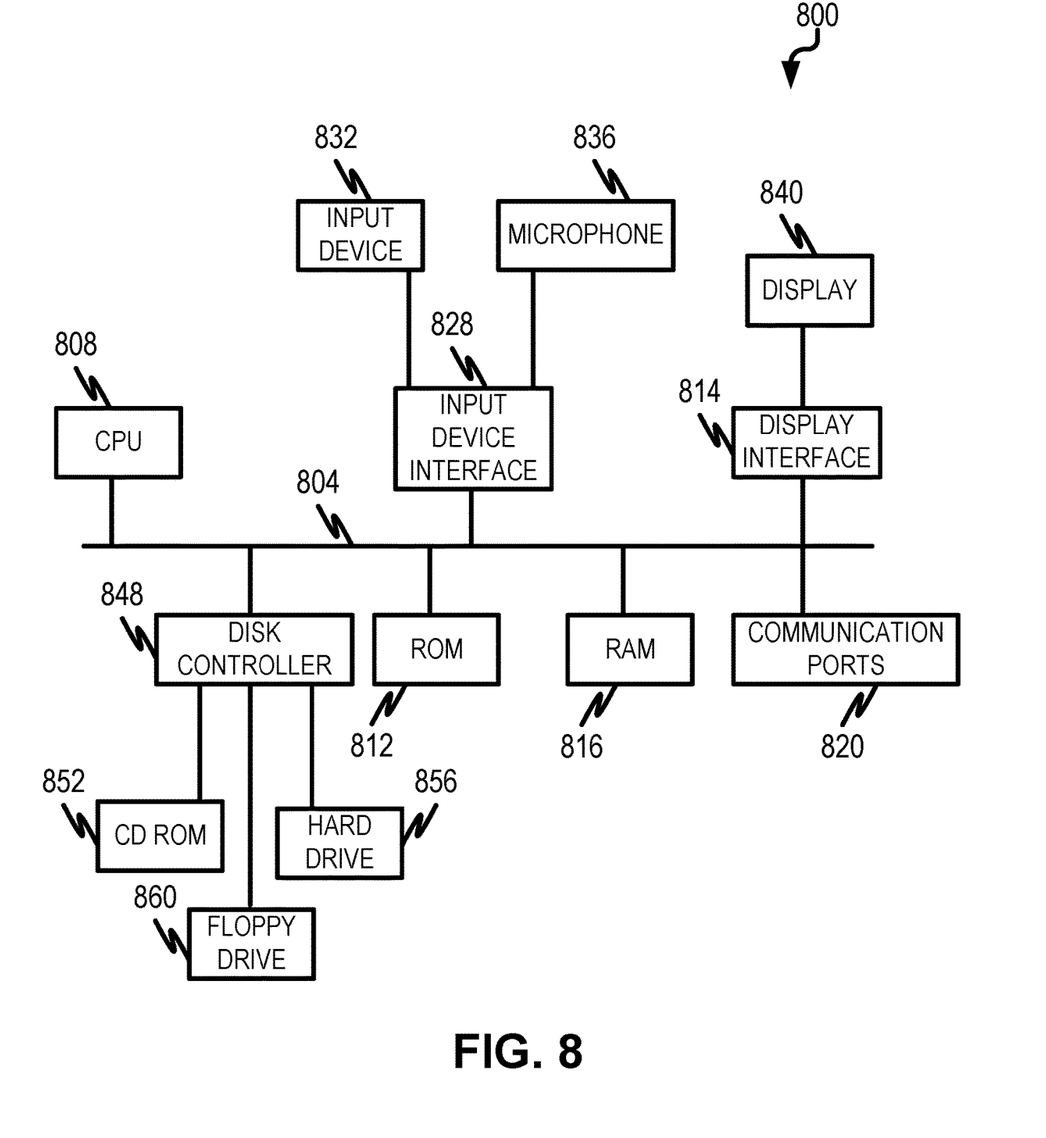
FIG. 8 illustrates an example computing architecture for implementing various aspects described herein.

FIG. 8 is a diagram 800 illustrating a sample computing device architecture for implementing various aspects described herein. A bus 804 can serve as the information highway interconnecting the other illustrated components of the hardware. A processing system 808 labeled CPU (central processing unit) (e.g., one or more computer processors/data processors at a given computer or at multiple computers), can perform calculations and logic operations required to execute a program. A non-transitory processor-readable storage medium, such as read only memory (ROM) 812 and random access memory (RAM) 816, can be in communication with the processing system 808 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 848 can interface one or more optional disk drives to the system bus 804. These disk drives can be external or internal floppy disk drives such as 860, external or internal CD-ROM, CD-R, CD-RW or DVD, or solid state drives such as 852, or external or internal hard drives 856. As indicated previously, these various disk drives 852, 856, 860 and disk controllers are optional devices. The system bus 804 can also include at least one communication port 820 to allow for communication with external devices either physically connected to the computing system or available externally through a wired or wireless network. In some cases, the communication port 820 includes or otherwise comprises a network interface.

To provide for interaction with a user, the subject matter described herein can be implemented on a computing device having a display device 840 (e.g., a CRT (cathode ray tube) or LCD (liquid crystal display) monitor) for displaying information obtained from the bus 804 to the user and an input device 832 such as keyboard and/or a pointing device (e.g., a mouse or a trackball) and/or a touchscreen by which the user can provide input to the computer. Other kinds of input devices 832 can be used to provide for interaction with a user as well; for example, feedback provided to the user can be any form of sensory feedback (e.g., visual feedback, auditory feedback by way of a microphone 836, or tactile feedback); and input from the user can be received in any form, including acoustic, speech, or tactile input. In the input device 832 and the microphone 836 can be coupled to and convey information via the bus 804 by way of an input device interface 828. Other computing devices, such as dedicated servers, can omit one or more of the display 840 and display interface 814, the input device 832, the microphone 836, and input device interface 828.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an un-recited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A computer-implemented method for generating a reduced-order simulation model of a large-scale integrated circuit, the method comprising:
    receiving an input layout of the large-scale integrated circuit, the input layout comprising a netlist having a plurality of segments;
    identifying groups of segments from the plurality of segments based on a numerical magnetic coupling factor;
    generating a plurality of matrices comprising a conductance matrix, a capacitance matrix, and an inductance matrix, wherein submatrices of the inductance matrix are based on the groups of segments and wherein generating the plurality of submatrices comprises
        (i) generating an inductance submatrix for each group of the groups of segments, wherein the inductance submatrix includes a full-rank representation of each group of the groups of segments,
        (ii) generating a mutual inductance submatrix for pairs of the groups of segments, wherein the mutual inductance submatrix includes a low-rank approximation of each pair of the groups of segments, and
        (iii) generating a hierarchical inductance matrix by combining together the inductance submatrix and the mutual inductance submatrix, wherein the hierarchical inductance matrix is an inductance matrix;
    generating a plurality of reduced-order matrices by performing model-order reduction on the conductance matrix, the capacitance matrix, and the hierarchical inductance matrix to reduce a memory requirement or reduce a computation cost; and
    outputting a reduced-order simulation model based on the plurality of reduced-order matrices for computer simulation of the large-scale integrated circuit.

2. The computer-implemented method of claim 1, wherein the plurality of matrices are generated by:
    extracting a resistance matrix, the capacitance matrix, and the inductance matrix from the input layout;
    generating a susceptance matrix by inverting the hierarchical inductance matrix; and
    applying a model-order reduction and generating at least two projections matrices by solving a linear system based on the resistance matrix, the capacitance matrix, and the susceptance matrix, wherein each reduced-order matrix is based on one of the at least two projection matrices.

3. The computer-implemented method of claim 2, wherein the linear system comprises: $(N+sQ+(A_l^T*S*A_l)/s)v_1=B$ and $v_2=S*(A_1*v_1)/s$, wherein N is the matrix with stamps of conductances, s is a constant number, v is another constant number, Q is a matrix with capacitor stamps, l is the hierarchical inductance matrix, $A_l$ is a nodes-to-inductors matrix, $A_l^T$ is a transpose of the nodes-to-inductors matrix, S is the susceptance matrix, B is a nodes-to-input-ports adjacency matrix, $v_1$ is a first solution matrix of the at least two projection matrices, and $v_2$ is a second solution matrix of the at least two projection matrices.

4. The computer-implemented method of claim 2, wherein the susceptance matrix is calculated by inverting the inductance matrix.

5. The computer-implemented method of claim 3, wherein the susceptance matrix is sparsified and a sparse linear-system solution is determined for the linear system.

6. The computer-implemented method of claim 3, wherein the first solution matrix and the second solution matrix are solutions of the linear system.

7. The computer-implemented method of claim 2, further comprising storing the inductance matrix, the resistance matrix, and the capacitance matrix in memory.

8. The computer-implemented method of claim 1, wherein the low-rank approximation is generated using a singular value decomposition algorithm.

9. The computer-implemented method of claim 1, wherein the inductance matrix is stored as a full-rank matrix and the mutual inductance is stored as a low-rank matrix.

10. The computer-implemented method of claim 1, wherein the plurality of reduced-order matrices are generated in parallel.

11. The computer-implemented method of claim 1, wherein the numerical magnetic coupling factor incorporates at least one of segment geometry, distance between segments, or orientation relative to segments.

12. A computer-implemented system for generating a digital simulation model of a large-scale integrated circuit, the computer-implemented system comprising:
one or more data processors;
one or more computer-readable storage mediums encoded with instructions for commanding the one or more data processors to execute steps that include:
receiving an input layout of the large-scale integrated circuit, the input layout comprising a netlist having a plurality of segments;
identifying groups of segments from the plurality of segments based on a numerical magnetic coupling factor;
generating a plurality of matrices comprising a conductance matrix, a capacitance matrix, and an inductance matrix, wherein submatrices of the inductance matrix are based on the groups of segments, and wherein generating the plurality of submatrices comprises
(i) generating an inductance submatrix for each group of the groups of segments, wherein the inductance submatrix includes a full-rank representation of each group of the groups of segments,
(ii) generating a mutual inductance submatrix for pairs of the groups of segments, wherein the mutual inductance submatrix includes a low-rank approximation of each pair of the groups of segments, and
(iii) generating a hierarchical inductance matrix by combining together the inductance submatrix and the mutual inductance submatrix, wherein the hierarchical inductance matrix is an inductance matrix;
generating a plurality of reduced-order matrices by performing model-order reduction on the conductance matrix, the capacitance matrix, and the hierarchical inductance matrix to reduce a memory requirement or reduce a computation cost; and
outputting a reduced-order simulation model based on the plurality of reduced-order matrices for computer simulation of the large-scale integrated circuit.

13. The computer-implemented system of claim 12, wherein the plurality of matrices are generated by:
extracting a resistance matrix, the capacitance matrix, and the inductance matrix from the input layout;
generating a susceptance matrix by inverting the hierarchical inductance matrix; and
applying a model-order reduction and generating at least two projections matrices by solving a linear system based on the resistance matrix, the capacitance matrix, and the susceptance matrix, wherein each reduced-order matrix is based on one of the at least two projection matrices, and
wherein the steps further comprise storing the inductance matrix, the resistance matrix, and the capacitance matrix in memory.

14. The computer-implemented system of claim 13, wherein the linear system comprises: $(N+sQ+(A_l^T*S*A_l/s))v_1=B$ and $v_2=S*(A_1*v_1)/s$, wherein N is the matrix with stamps of conductances, s is a constant number, v is another constant number, Q is a matrix with capacitor stamps, l is the hierarchical inductance matrix, $A_l$ is a nodes-to-inductors matrix, $A_l^T$ is a transpose of the nodes-to-inductors matrix, S is the susceptance matrix, B is a nodes-to-input-ports adjacency matrix, $v_1$ is a first solution matrix of the at least two projection matrices, and $v_2$ is a second solution matrix of the at least two projection matrices.

15. The computer-implemented system of claim 13, wherein the susceptance matrix is calculated by inverting the inductance matrix.

16. The computer-implemented system of claim 14, wherein the susceptance matrix is sparsified and a sparse linear-system solution is determined for the linear system.

17. The computer-implemented system of claim 14, wherein the first solution matrix and the second solution matrix are solutions of the linear system.

18. The computer-implemented system of claim 12, wherein
the low-rank approximation is generated using a singular value decomposition algorithm, and
the inductance matrix is stored as a full-rank matrix and the mutual inductance is stored as a low-rank matrix.

19. The computer-implemented system of claim 12, wherein the plurality of reduced-order matrices are generated in parallel.

20. A non-transitory computer-readable storage medium comprising instructions for which when executed cause a processing system to execute steps comprising:
receiving an input layout of the large-scale integrated circuit, the input layout comprising a netlist having a plurality of segments;
identifying groups of segments from the plurality of segments based on a numerical magnetic coupling factor;
generating a plurality of matrices comprising a conductance matrix, a capacitance matrix, and an inductance matrix, wherein submatrices of the inductance matrix are based on the groups of segments, and wherein generating the plurality of submatrices comprises
(i) generating an inductance submatrix for each group of the groups of segments, wherein the inductance submatrix includes a full-rank representation of each group of the groups of segments,
(ii) generating a mutual inductance submatrix for pairs of the groups of segments, wherein the mutual inductance submatrix includes a low-rank approximation of each pair of the groups of segments, and
(iii) generating a hierarchical inductance matrix by combining together the inductance submatrix and the mutual inductance submatrix, wherein the hierarchical inductance matrix is an inductance matrix;
generating a plurality of reduced-order matrices by performing model-order reduction on the conductance matrix, the capacitance matrix, and the hierarchical inductance matrix to reduce a memory requirement or reduce a computation cost; and
outputting a reduced-order simulation model based on the plurality of reduced-order matrices for computer simulation of the large-scale integrated circuit.

* * * * *